F. LACEY.
FRICTION LET-OFF FOR LOOMS.
APPLICATION FILED APR. 28, 1917.

1,335,510.

Patented Mar. 30, 1920.
6 SHEETS—SHEET 1.

Fig. 1.ᵃ

Witnesses:
Oscar F. Hill
Ellen O. Spring

Inventor:
Fred Lacey
by Chas. F. Randall
Attorney

F. LACEY.
FRICTION LET-OFF FOR LOOMS.
APPLICATION FILED APR. 28, 1917.
1,335,510.
Patented Mar. 30, 1920.
6 SHEETS—SHEET 2.
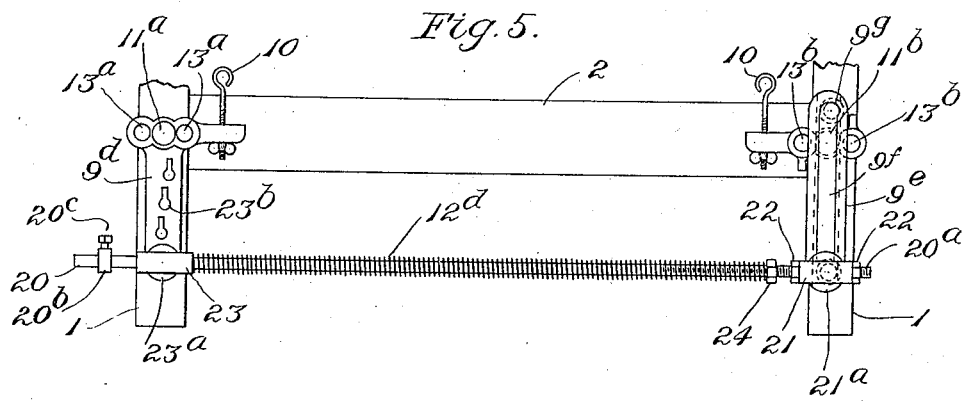
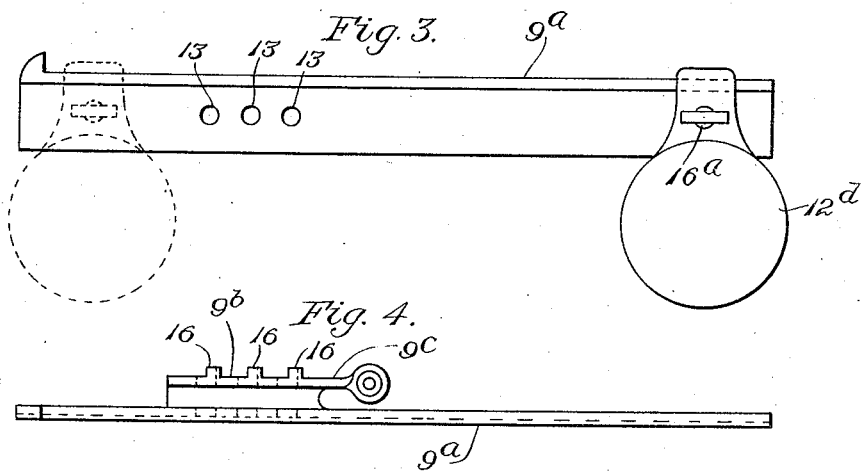

F. LACEY.
FRICTION LET-OFF FOR LOOMS.
APPLICATION FILED APR. 28, 1917.
1,335,510. Patented Mar. 30, 1920.
6 SHEETS—SHEET 3.
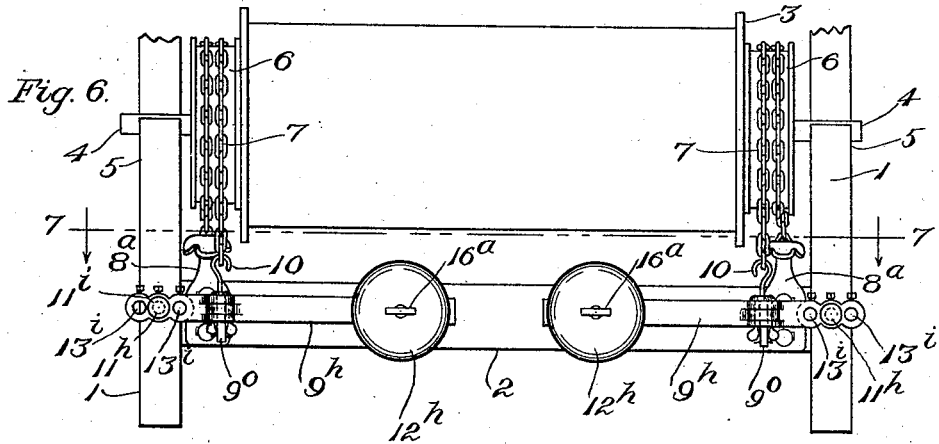
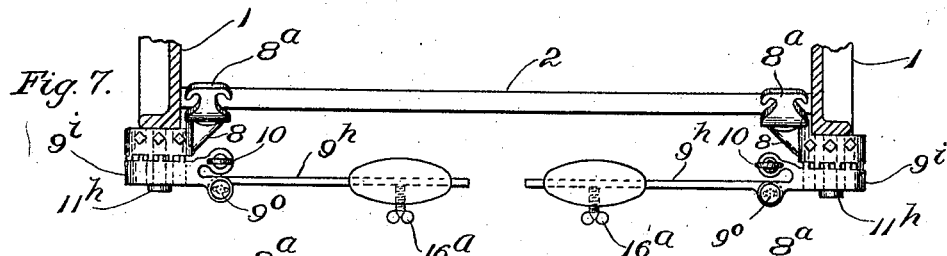
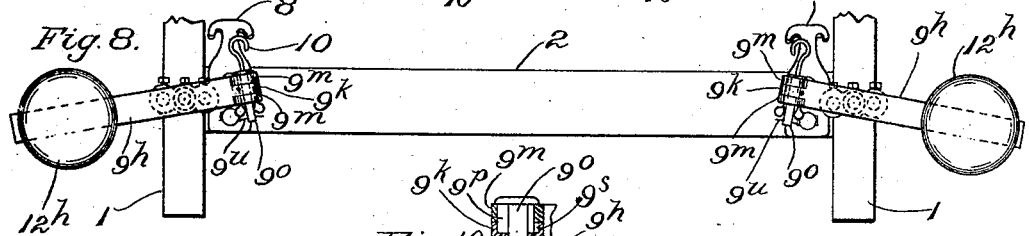
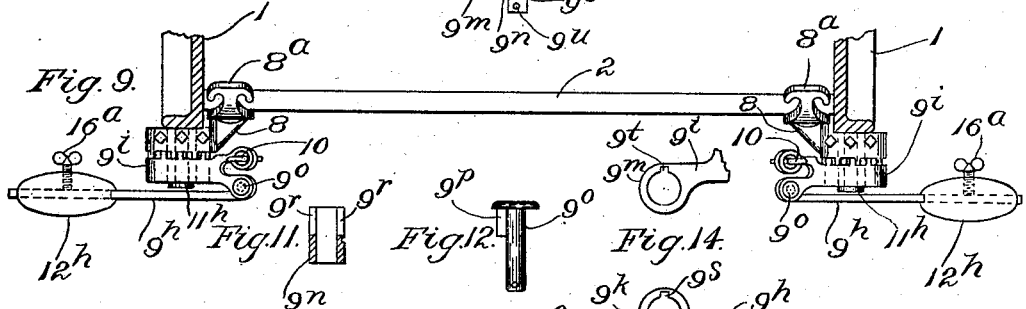
Witnesses:
Oscar F. Hill
Ellen O. Spring
Inventor:
Fred Lacey
by Chas. F. Randall
Attorney.

F. LACEY.
FRICTION LET-OFF FOR LOOMS.
APPLICATION FILED APR. 28, 1917.

1,335,510.

Patented Mar. 30, 1920.
6 SHEETS—SHEET 4.

Witnesses:
Oscar F. Hill
Ellen O. Spring

Inventor
Fred Lacey
by Chas. F. Randall
Attorney

F. LACEY.
FRICTION LET-OFF FOR LOOMS.
APPLICATION FILED APR. 28, 1917.
1,335,510.
Patented Mar. 30, 1920.
6 SHEETS—SHEET 5.
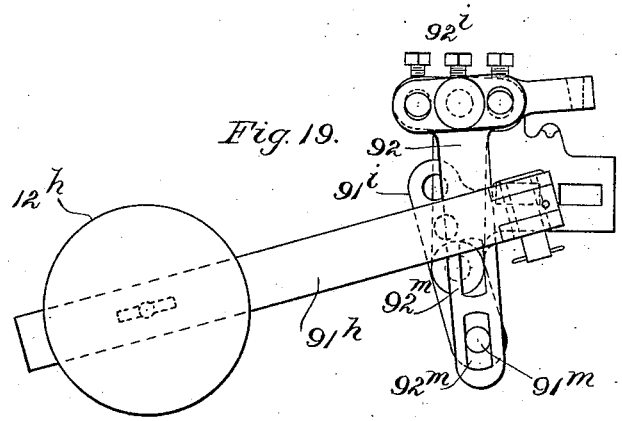
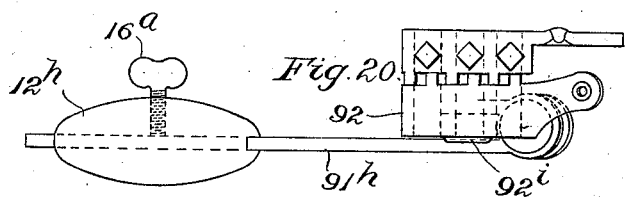
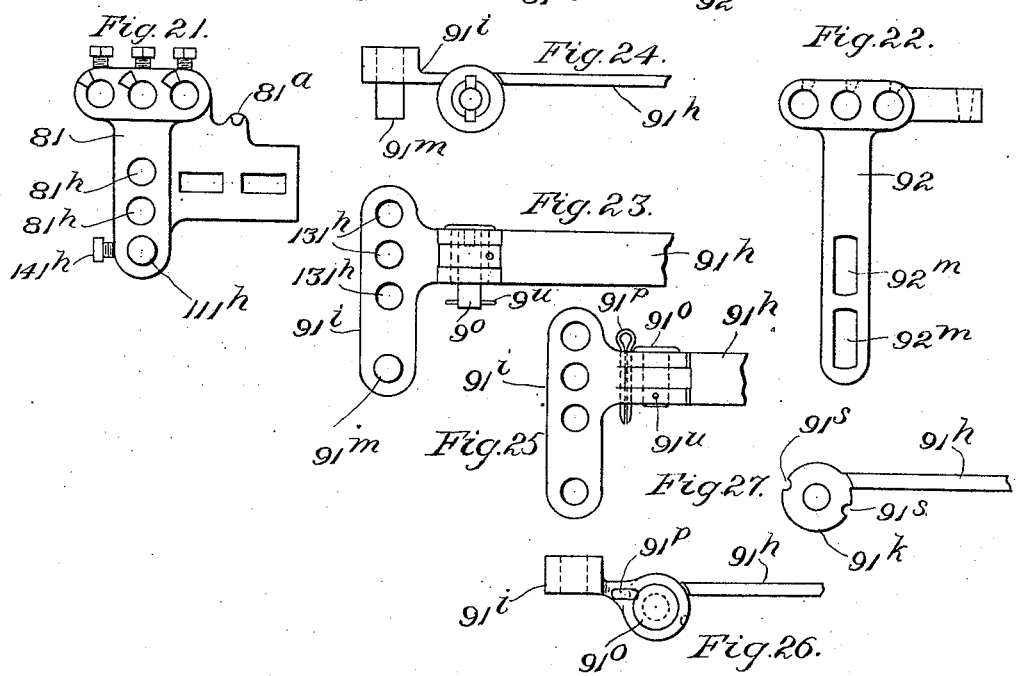
Witnesses:
Oscar F. Hill
Ellen O. Spring
Inventor:
Fred Lacey
by Chas. F. Randall
Attorney.

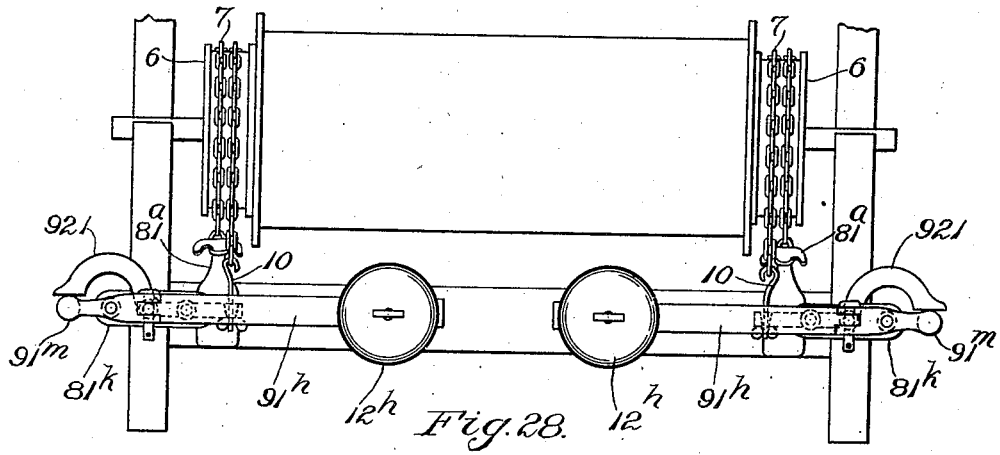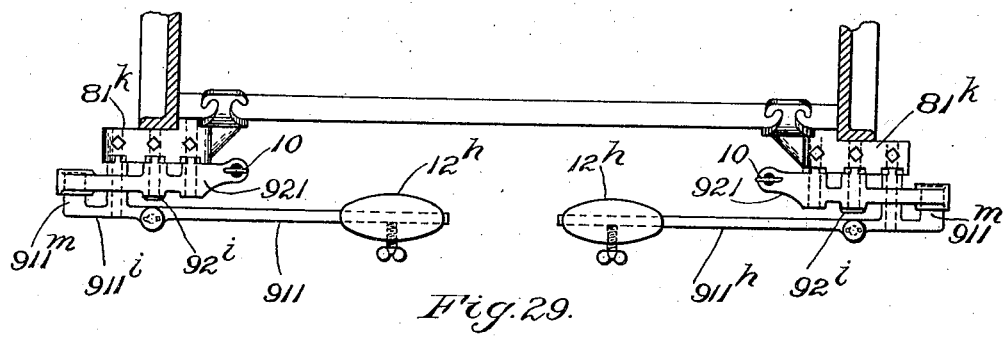

UNITED STATES PATENT OFFICE.

FRED LACEY, OF LOWELL, MASSACHUSETTS.

FRICTION LET-OFF FOR LOOMS.

1,335,510.  Specification of Letters Patent.  Patented Mar. 30, 1920.

Application filed April 28, 1917. Serial No. 165,133.

*To all whom it may concern:*

Be it known that I, FRED LACEY, a citizen of the United States, residing at Lowell, in the county of Middlesex, State of Massachusetts, have invented a certain new and useful Improvement in Friction Let-Offs for Looms, of which the following is a specification, reference being had therein to the accompanying drawings.

The invention has relation to friction let-offs for controlling the delivery of yarns from beams upon which they have been wound, as for instance in the case of the warp-beams of looms, and other supply beams in yarn-preparing machines, and in other machines and processes.

The invention relates, more particularly, to let-offs in which the friction-producing means comprises a lever and tension-means acting through the said lever to occasion the required frictional resistance to the turning of a beam under the pull upon the yarns which draws the latter from the beam.

In practice it becomes necessary from time to time to relieve the friction so as to permit a beam to be turned by the operator for some purpose, which purpose may be to pay off the yarns and thereby slacken them, or it may be to rewind the slack upon the beam. The general object of the invention is to provide for relieving the friction without actual disconnection of the tension-means from the lever, and without the employment of supplemental means for operating upon the lever to relax or relieve the frictional contact; and to provide, further, for conveniently restoring the friction. To these ends, the invention consists in friction let-off means constructed to enable the friction to be relieved by a shift of the tension-means from its normal working position, in which its force is applied to the let-off lever at one side of the fulcrum of the said lever to produce the desired friction, to a temporary position in which its force is applied at the other side of the said fulcrum, where it operates with a tendency to reduce and relieve the friction. The said construction, also, permits the friction to be restored simply by returning the tension-means from its temporary working position to its normal working position.

The tension means of friction let-offs is a weight in some instances; in others, it is a spring. The principles of the invention are applicable in the case of both weight-operated friction let-offs and spring-operated friction let-offs. I have shown herein illustrative embodiments of the principles of the invention, of both the weight-operated class and the spring-operated class.

In the drawings,—

Figure 1 is a rear elevation of portions of a loom-frame and warp-beam, and a weight-operated friction-lever, showing one embodiment of the principles of the invention.

Fig. 1ª is a view of the weight-lever and weight, looking at the same from the right-hand side in Fig. 1.

Fig. 3 is a rear elevation showing a weight-lever slightly different in construction from that of Figs. 1 and 2.

Fig. 4 is a plan view of the weight-lever of Fig. 3.

Fig. 5 is a rear elevation showing a pair of spring-operated friction-levers.

Fig. 6 is a rear elevation of a let-off employing a pair of jointed weight-levers, showing the warp-beam and friction-chains.

Fig. 7 is a partly-sectional plan view of the parts of Fig. 6, omitting the warp-beam and friction-chains.

Fig. 8 is a rear elevation of the parts shown in Fig. 7, but representing the weights shifted into position to relieve the friction.

Fig. 9 is a partly-sectional plan view of the same parts, showing them positioned as in Fig. 8.

Figs. 10 to 15 are views of details, and are referred to hereinafter.

Fig. 19 is a rear elevation of the parts of Figs. 17 and 18, but shown in the relief position.

Fig. 20 is a plan view of the parts as shown in Fig. 19.

Figs. 21 to 27 are views of details of the let-off arrangement of Figs. 16 to 20.

Fig. 28 is a rear elevation showing a second compound-lever arrangement.

Fig. 29 is a partly sectional plan view of the parts that are shown in Fig. 28, with the warp-beam and chains omitted.

Having reference to the drawings,—

Figure 1:
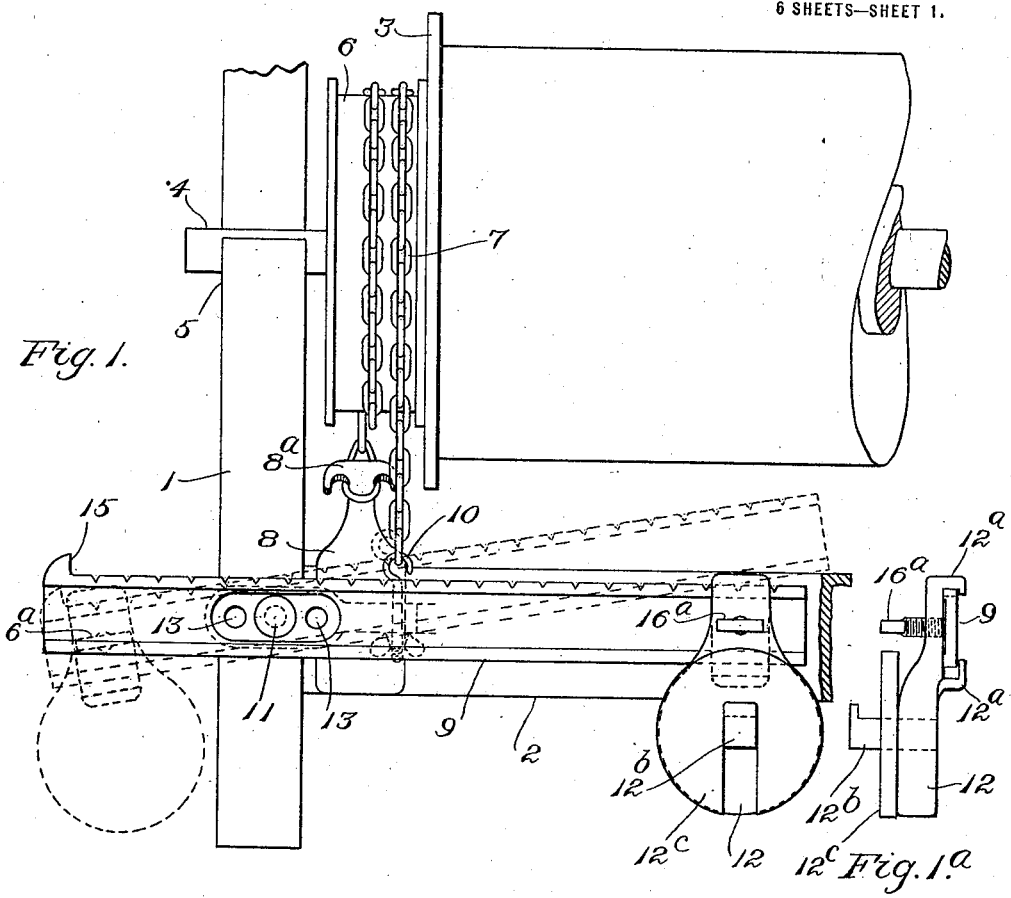

Certain of the views show portions of one or both side-frames 1, 1, of a loom, and a rear girth 2 connecting the said side-frames. Some of them show a warp-beam 3 having its journals 4, 4, seated in bearings 5, 5, in connection with the side-frames. The said warp-beam has ruffles 6, 6, in connection with its opposite ends or heads, and friction-chains 7, 7, are wrapped around the said ruffles. Brackets 8, 8, are shown fixed to the girth 2, each having an upwardly-extending hooked portion 8ª with which one end of the adjacent friction-chain is engaged, and 9, 9, 9ª, etc., are let-off levers to which the other ends of the respective chains are connected through engagement with hooks 10, 10, which are engaged in turn with the said levers.

Figure 2:
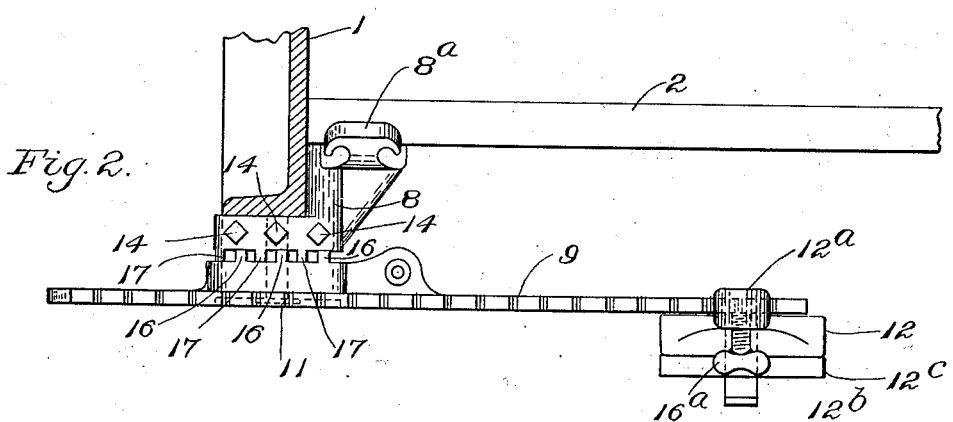
Fig. 2 is a partly-sectional plan view of the weight-lever and weight of Fig. 1, together with the adjacent portions of the loom-frame, the warp-beam and friction-chain being omitted.
Figure 16:
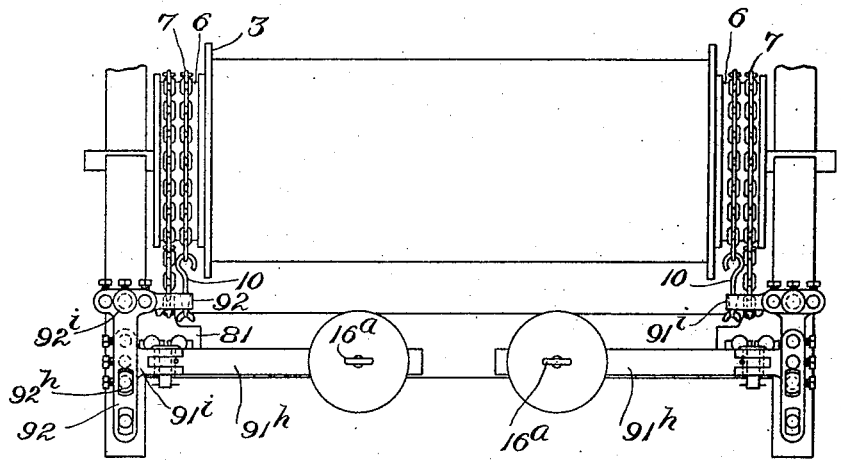
Fig. 16 is a rear elevation showing a compound-lever arrangement at each end of a warp-beam.
Figure 17:
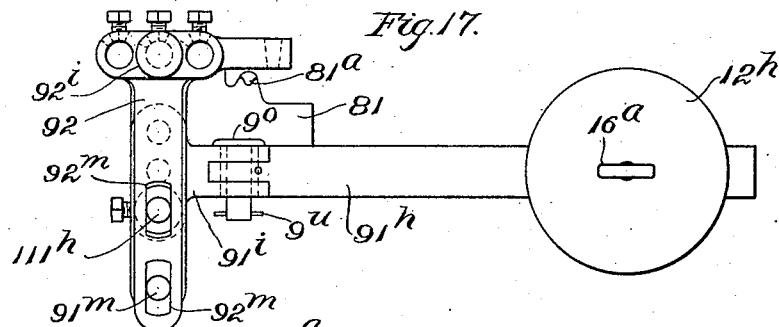
Fig. 17 is a rear elevation of one of the compound-lever arrangements of Fig. 16, shown on an enlarged scale.
Figure 18:
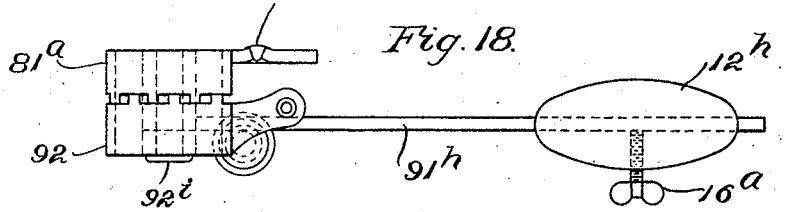
Fig. 18 is a plan view of the parts shown in Fig. 17.

Referring first to Figs. 1, 1ª, and 2, the weight-lever 9 is mounted upon the adjacent side-frame 1 by means of a pivotal supporting-pin 11 applied to the rear portion of the corresponding bracket 8. The corresponding friction-chain 7 is engaged with the inwardly-extending arm of the said lever, upon which arm the weight 12 is hung during the regular working of the devices. The weight 12 is formed with hooked projections which engage with the top and bottom edge-portions of the weight-lever, the upper projection being shaped to engage in notches formed in the top of the lever. The illustrated construction provides for a shift of the weight along the arm to vary the effect of the weight in producing friction between the chain 7 and the exterior surface of the ruffle 6, and the notches of the lever serve to prevent accidental displacement of the weight. To provide for varying the amount of weight that is hung upon the lever, the weight 12 is furnished with a projection 12ᵇ upon which one or more supplemental weights 12ᶜ may be hung. Variation in the leverage is provided for by forming the lever 9 and bracket 8, respectively, with a series of holes 13, 13, for the reception of the pivotal-pin 11, and when such variation is to be effected the pin is shifted from one hole to another. Clamping screws 14, 14, 14, Fig. 2, are provided in connection with the respective holes in bracket 8 to hold the pin 11 in place. The said pin is headed or flanged at its outer end so as to keep the lever 9 thereon.

In carrying the invention into effect, the lever 9 is formed with an extension projecting outward beyond the pivot 11. This enables the weight to be shifted bodily along the lever, from its working position upon the inwardly projecting arm of the lever as in full lines in Figs. 1 and 2, to a position at the outer side of the pivot as in dotted lines in Fig. 1. In this latter position the weight acts with a tendency to tilt the lever into the dotted line position shown in Fig. 1, so as to slacken the friction-chain 7 and thereby throw off the friction, thereby leaving the beam free to be turned by the weaver. Subsequently, a simple shift of the weight back from the position at the outer side of the lever pivot to a position at the inner side of said pivot will cause the weight to operate the lever to reinstate the friction. An upwardly projecting shoulder 15 upon the outer extremity of the lever prevents the weight from slipping off from said extremity in the dotted line positions of the weight and lever.

To limit the extent of the swinging movements of the lever, it is formed with stop-projections 16, 16, 16, adapted to engage with stop-projections 17, 17, 17, on the stand 8. The projections 16, 16, 16, are formed above the respective holes 13 through the lever. The projections 17, 17, 17, alternate with the holes in the stand. In a given position of adjustment of the pivotal pin 11, the particular projection 16 that corresponds with the hole 13 occupied by the pin will coöperate with the projections 17, 17, at opposite sides thereof in limiting the play of the lever. The other projections 16, 16, will work idly up and down between the neighboring projections 17, 17.

The let-off arrangement of Figs. 1, 1ª, 2, may be duplicated at the other end of the warp-beam. The modified weight-lever 9ª of Figs. 3 and 4 is made of comparatively thin stock, with the required thickness of the pivotal portion thereof secured by bending around and upward a portion 9ᵇ, thereby giving a sufficiently long or broad bearing upon the pivot-pin to provide against wabbling. The friction-chain is engaged by means of a hook with the projecting extremity 9ᶜ of the said portion 9ᵇ. The top of the lever may be notched as in the form first described, to hold the weight, 12ᵈ, in adjusted position, or this result may be secured by means of a clamping screw 16ª, the stem of which works in a threaded hole tapped through the upper portion of the weight so that the inner end of the screw may bind against one side of the lever, or both the notches and the screw may be utilized if preferred. If desired a similar screw, 16ª, may be used in connection with the weight and lever of Figs. 1, 1ª, and 2, as shown in such views.

Fig. 5 shows a let-off arrangement in which a spring is used instead of a weight.

This arrangement comprises the two let-off levers $9^d$, $9^e$, located at opposite sides of the loom, and provided with hooks 10, 10, for engagement with the chains that pass around ruffles or heads at opposite ends of the warp-beam. Lever $9^d$ is mounted upon a pivotal pin $11^a$, and provided with a series of holes $13^a$ adapted to receive the said pin, similar holes being provided in the supporting-stand (not shown) to provide for adjustment of the leverage. Similarly, lever $9^e$ is mounted upon a pivotal pin $11^b$, and provided with a series of holes $13^b$ adapted to receive such pin, similar holes being provided in the supporting stand, to provide for adjustment of the leverage. The tension means comprises the spring $12^d$, and means for transmitting its tension to the two let-off levers. The said spring acts expansively in this particular instance, which however is not essential to the invention. It is mounted upon a rod 20, one end-portion of which is screw-threaded at $20^a$. The screw-threaded portion goes through a sleeve 21 forming part of a connector $21^a$ that engages with the lever $9^e$. Nuts 22, 22, upon the screw-threaded portion fit against opposite ends of the sleeve 21 so as to hold the rod and sleeve in fixed relations. Thereby the rod is engaged with the connector, and through the latter with the let-off lever $9^e$. The opposite end-portion of rod 20 goes through a sleeve 23 forming part of a connector $23^a$ that is engaged with the let-off lever $9^d$. One end of the expanding spring $12^d$ bears against the inner end of sleeve 23. The other end of the said spring bears against a shoulder in fixed connection with the rod, such shoulder being constituted by a collar or nut 24. By reason of its tendency to expand, the spring tends to push sleeve 23, connector $23^a$, and lever $9^d$ in the direction to apply the required friction at the left-hand end of the warp-beam, and it also tends to push rod 20, sleeve 21, connector $21^a$, and lever $9^e$ in the direction to apply the required friction at the right-hand end of the warp-beam. The collar or nut 24 is screwed upon the threaded portion of the rod so that it may be adjusted lengthwise of the rod to compress the spring more or less and thereby adjust the tension of the spring. The spring pressure acts equally at both ends of the beam.

Connector $23^a$ has a shank-portion adapted to enter any one of a series of button-hole shaped slots $23^b$ which are made in the let-off lever $9^d$. These slots are located at different distances from the fulcrum of the lever, so that by shifting the connector-shank from one slot to another the leverage may be varied.

In applying my present invention in the case of the construction shown in Fig. 5, the let-off lever $9^e$ is formed with an undercut groove $9^f$ extending lengthwise thereof, and the shank of connector $21^a$ is shaped to fit in the said groove, a flange upon the end of said shank working in the undercut portion of the groove and serving to prevent the connector from becoming separated accidentally from the lever. Normally, the connector $21^a$ occupies a position at the lower end of the lever, below the fulcrum of the lever, with its shank seated in a recess at the outer side of the groove, so that the connector is not likely to become displaced upward accidentally. So long as the connector occupies such position, the pressure of the spring transmitted to the two levers acts with a tendency to maintain the required friction at both ends of the warp-beam. The groove $9^f$ extends above the fulcrum of the lever, $9^e$, and when it is desired to take off the friction from the beam it is necessary simply to move the right-hand end of the rod 20 upward until connector $21^a$ has been given a position above the said fulcrum. In this position of the connector $21^a$, the tension of the spring will be applied to lever $9^e$ at a point above the lever-fulcrum, and consequently will act with a tendency to turn the said lever in the direction to slacken the connected chain and relieve the friction at the corresponding end of the beam. This turning movement of lever $9^e$ will relieve the tension of the spring, so that the pressure of the latter against the other let-off lever, $9^d$, will be relaxed, and the friction at the left-hand end of the beam, also will be relieved. A lateral notch $9^g$ at the upper end of groove $9^f$ is occupied by the shank of connector $21^a$ when the latter is at such end of the groove, so that the connector tends to remain in place above the lever-fulcrum, with the friction off, until the rod is pressed down by the attendant for the purpose of restoring the friction.

Figs. 6 to 9 illustrate an embodiment of the broad principles of my invention in which the construction of the two let-off levers, $9^h$, $9^h$, at opposite sides of the loom is such as to permit the weight-carrying portion of each of the said levers to be swung bodily from its working position at one side of the lever-fulcrum $11^h$, such position being shown in Figs. 6 and 7, around into a relief position at the other side of the said fulcrum, such relief position being shown in Figs. 8 and 9. In the relief position of the weight 12, it operates to relieve the friction.

In this embodiment, each let-off lever $9^h$, comprises a hub-portion $9^i$ and the weight-carrying portion or arm. The hub-portion is formed with a series of holes $13^i$, $13^i$, to permit shift of the fulcrum-pin $11^h$ from one of such holes to another, a corresponding series of holes being provided in the stand 8. The said hub-portion and the stand are furnished with coacting stop-projections similar to the projections 16, 17, which already have been described. The hook 10 that engages with one end of the adjacent friction-chain 7 is engaged with the hub-portion. To permit the weight-carrying portion or arm to be swung from the normal working position occupied by it in Figs. 6 and 7 to the relief position occupied by it in Figs. 8 and 9, the said portion or arm is connected with the hub-portion by means of a vertical pivot.

To provide for the pivotal connection of the weight-carrying portion or arm of lever $9^h$ with the corresponding hub-portion $9^i$, the said weight-carrying portion or arm is provided with an ear or lug $9^k$, and the hub-portion is provided with a pair of ears or lugs $9^m$, $9^m$, spaced apart to receive between them the ear or lug $9^k$. The three ears or lugs are bored centrally as shown best in Figs. 14 and 15, and when the parts have been assembled, with the lug or ear $9^k$ between the pair of ears or lugs $9^m$, $9^m$, a bushing $9^n$ is placed within the holes in the ears or lugs and made fast with the ear or lug $9^k$ by means of a transverse pin, this bushing serving as a pivotal connection between the weight-carrying portion or arm and the hub-portion. Thereby the swinging movement of the weight-carrying portion or arm is provided for. I prefer to provide means for locking the weight-carrying portion or arm of each let-off lever in its respective positions, so as to guard against accidental departure from the desired position. While the locking may be provided for variously, I have herein shown a locking-pin $9^o$, the stem of which is entered into the central bore of the bushing $9^n$. To prevent the pin $9^o$ from dropping through the hole in the bushing, a shoulder is provided upon the upper end of the pin to rest upon the top of the bushing or the top of the upper ear or lug $9^m$. This shoulder is provided conveniently by furnishing the pin with a flanged head. To enable the pin to serve as a locking means, it is furnished with a laterally projecting wing or fin $9^p$. In addition, the upper portion of the bushing $9^n$ is longitudinally slotted at diametrically opposite points $9^r$, $9^r$, Fig. 11, the upper ear or lug $9^m$ is notched internally at $9^t$, Fig. 14, and ear or lug $9^k$ is notched internally at two opposite points, as $9^s$, $9^s$, Fig. 15. The slots $9^r$, $9^r$, and notches $9^s$, $9^s$, $9^t$, are adapted to receive the wing or fin $9^p$ of the locking-pin $9^o$. In the working position of the weighted portion or arm of a let-off lever one of the slots $9^r$ of the bushing and the corresponding one of the notches, $9^s$, $9^s$, of said weighted portion or arm are presented in position to register with the notch $9^t$, of the top ear or lug $9^m$. To lock the weighted portion or arm in the said working position, the pin $9^o$ is pushed down within the bushing $9^n$ with its wing or fin $9^p$ projecting through the said slot $9^r$ of the bushing and entered into the registering notches $9^t$ and $9^s$ of the top ear or lug $9^m$ and the ear or lug $9^k$. To unlock the weighted portion or arm of the let-off lever, the pin $9^o$ is raised sufficiently to withdraw the wing or fin $9^p$ from the slot $9^r$ and notch $9^s$ previously occupied by it. This leaves the said weighted portion or arm free to be swung to its outturned or relief position. In the latter position, the other slot $9^r$ and notch $9^s$ are presented to the wing or fin $9^p$ of the locking-pin $9^o$, and on dropping or pushing the pin down so as to cause the said wing or fin to enter the second slot $9^r$ and second notch $9^s$ as well as the notch $9^t$ the weighted portion or arm of the let-off lever is locked in the said outturned or relief position. To prevent the locking pin $9^o$ from being lifted too far and thereby withdrawn from the bushing, a cotter-pin $9^u$ is passed through a hole in the lower end of the said pin below the lower ear or lug $9^m$.

The embodiment that is illustrated in Figs. 6 to 15 comprises a single-lever arrangement at each side of the loom acting in conjunction with the corresponding end of the warp-beam. Figs. 16 to 27 illustrate a compound-lever arrangement. In general terms this latter arrangement comprises a secondary lever 92, shown separately in Fig. 22, having engaged therewith the hook 10 which engages with one end of the friction-chain 7 passing around the ruffle 6 at the corresponding end of the warp-beam. The said secondary lever is mounted by means of a pivotal pin $92^i$ upon the stand 81, shown separately in Fig. 21, provided with the hook $81^a$ with which the other end of the said friction-chain is engaged. The same provisions for shift of the fulcrum-pin $92^i$, and for limiting the extent of swinging movement, are made in connection with the secondary lever 92 as are made, as previously described herein, in connection with the let-off levers to which reference already has been made. With the said secondary lever 92 is operatively combined a hinged primary lever $91^h$, partly shown separately in detail in Figs. 23 and 24, corresponding in general respects with the hinged lever $9^h$ of Figs. 6 to 15, but differing therefrom in the respect that the primary lever $91^h$ engages with and operates the secondary lever 92, instead of directly connecting with the friction-chain 7. The hub-portion $91^i$ of the hinged lever is mounted pivotally upon the stand 81 by means of a pivotal stud or pin $111^h$, Fig. 21, set in a hole in the said stand and secured therein by a clamping screw $141^h$, there being a series of holes $131^h$, and $81^h$ in the said hub-portion and the said stand, respectively, at different points one above another to provide for shifting the stud or pin 111$^h$. Each hole 81$^h$ has in conjunction therewith a threaded hole for the fastening screw 141$^h$ so as to vary the leverage of the primary lever. The hub-portion also carries a pin 91$^m$ for engagement with the secondary lever 92 so as to actuate the secondary lever from the primary lever. When pivotal stud or pin 111$^h$ is shifted to a higher position, this pin 91$^m$ may be shifted to the hole in hub-portion 91$^i$ at present shown occupied by the said pivotal stud or pin so as to engage with the secondary lever at the required distance from the fulcrum of the secondary lever, thereby providing for further changes and adjustments of the leverage. Upper and lower vertical slots 92$^m$, 92$^m$, Fig. 22, are formed in the downwardly-extending arm of the secondary lever 92 to receive the projecting portion of the connecting and transmitting pin 91$^m$ in each of its positions of adjustment. The hinge-connection between the weight-carrying portion or arm of the primary lever and its hub-portion, and the provisions for locking and unlocking the said weight-carrying portion or arm, are or may be the same as described in the case of the construction shown in Figs. 6 to 15. Figs. 25, 26, and 27 show a simplified construction of the hinge and lock, dispensing with the bushing and locking-pin with fin or wing, and having the ears or lugs of the weight-carrying portion or arm and the hub-portion fitted directly to the pivotal stud or pin, the said stud or pin being fixed in place within the said ears by means of a transverse pin 91$^u$ passing through the lowermost ear or lug and the lower end of the pivotal pin or stud. The locking is effected by providing the ear or lug 91$^h$, Fig. 27, of the swinging weight-carrying portion or arm with opposite notches 91$^s$, 91$^s$, to receive the intermediate portion of a pin 91$^p$ occupying a hole or holes made vertically through the hub-portion. This pin, preferably made as a spring-cotter-pin, may be withdrawn to unlock the parts and then inserted again after the weight-carrying portion or arm has been swung into the required position, so as by engaging in one of the notches 91$^s$, 91$^s$, of the ear or lug 91$^k$ of the said portion or arm to lock the latter in the said position.

Figs. 28 and 29 show a second compound lever arrangement in which the hinged primary lever, here designated 911, has its hub-portion 911$^i$ formed with an outwardly extending arm provided with the pin 911$^m$ for engagement with an outwardly extending arm of the secondary lever, which is designated 921. Secondary lever 921 is mounted substantially as in the case of lever 92 of Figs. 16 to 27. Pin 911$^m$ acts upwardly against the under side of the outer end of the said outwardly extending arm of secondary lever 921.

In practice, in the case of a let-off mechanism having an ordinary weighted lever, the weight frequently is removed from the lever by the weaver. There is always a liability that in being replaced it may not be put back at the same point upon the lever. In such event a variation in the warp tension will result. In the case of the hinged lever constructions shown herein, the weight always goes back to the same point or place, so that such a variation is avoided.

I claim as my invention:—

1. Friction let-off means comprising a let-off lever and tension-means therefor, and constructed to enable the friction to be relieved by a shift of the tension-means relative to the lever itself from its normal working position applying force to the said lever at one side of the fulcrum of the latter to produce the required friction, to a temporary position in which its force is applied at the other side of said fulcrum.

2. Friction let-off means comprising a let-off lever and a tension-weight operatively combined therewith, and constructed to enable the friction to be relieved by a shift of the tension-weight relative to the lever itself from its normal working position applying force to the said lever at one side of the fulcrum of the latter, to produce the required friction, to a temporary position in which its force is applied at the other side of said fulcrum.

3. Friction let-off means comprising a let-off lever and tension-means therefor normally transmitting tension to the said lever along a line of action at one side of the fulcrum of the lever, and movable relative to the lever itself to enable the friction to be relieved by a shift of the said line of action to the other side of said lever fulcrum.

4. Friction let-off means comprising a let-off lever composed of a hub-portion and an operating portion or arm having tension means combined therewith, said operating portion or arm individually movable to permit it to assume by movement in a horizontal plane a normal working position or an opposite position in which by application of the operating tension at the opposite side of the lever-fulcrum it acts to relieve the friction.

5. Friction let-off means comprising a let-off lever composed of a hub-portion and an operating portion or arm having tension means combined therewith, said operating portion or arm movably connected with said hub-portion and adapted to be shifted with the said tension means from a working position at one side of the fulcrum of the lever to a relief position at the opposite side of said fulcrum.

6. Friction let-off means comprising a let-off lever composed of a hub-portion and a weight-carrying portion or arm movably combined with said hub-portion with capacity to be swung from its normal working position to a relief position in which the weight operates the lever to relieve the friction.

7. Friction let-off means comprising a secondary lever in connection with the friction-producing means, and a primary lever having a hub-portion operatively combined with the said secondary lever, and an operating portion or arm having tension-producing means operatively combined therewith, the said operating portion or arm movably connected with the said hub-portion and adapted to be shifted with the said tension-producing means from a working position at one side of the fulcrum of the primary lever to a relief position at the opposite side of the said fulcrum.

In testimony whereof I affix my signature in presence of two witnesses.

FRED LACEY.

Witnesses:
  TOM ROBINSON,
  HAROLD G. WORTH.